A. JOHNSON & C. L. BOCKUS.
PROCESS FOR PRODUCING FRONT YOKE AXLES.
APPLICATION FILED MAR. 4, 1910.

963,372.

Patented July 5, 1910.

UNITED STATES PATENT OFFICE.

ALFRED JOHNSON AND CHARLES L. BOCKUS, OF DETROIT, MICHIGAN.

PROCESS FOR PRODUCING FRONT YOKE-AXLES.

963,372.        Specification of Letters Patent.        Patented July 5, 1910.

Application filed March 4, 1910. Serial No. 547,208.

*To all whom it may concern:*

Be it known that we, ALFRED JOHNSON, a citizen of the United States, and CHARLES L. BOCKUS, a subject of the King of Great Britain, residing at Detroit, county of Wayne, State of Michigan, have invented a certain new and useful Improvement in Processes for Producing a Front Yoke-Axle, and declare the following to be a full, clear, and exact description of the same, such as will enable others skilled in the art to which it pertains to make and use the same, reference being had to the accompanying drawings, which form a part of this specification.

This invention relates to the art of producing the front axle yoke of an automobile vehicle.

The front axle yoke commonly used has at each end thereof, a fork, one member of which serves as a foot bearing and the other as an upper bearing member for a vertical spindle or shaft upon which the axle and hub of the front wheel swing, and in the construction of this axle yoke, which should be as light as it is possible consistent with the requisite strength, it is desirable that the structure be made with the grain of the metal running along the main body of the yoke, along the axes of the two forked members or yoke members, and along the connecting part of the fork, as the lines of usual breakage are across the axes of the members referred to.

In the process which is hereinafter described, a straight bar of metal is selected and bent and drawn to the requisite shape, care being taken in the several steps of the process to keep the arrangement of the grain of the metal in the desired way as specified.

Figure 1:
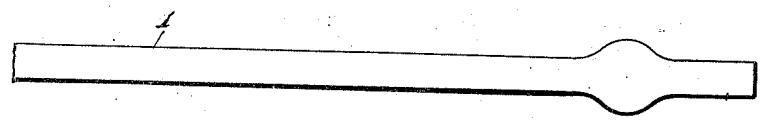
Figure 2:
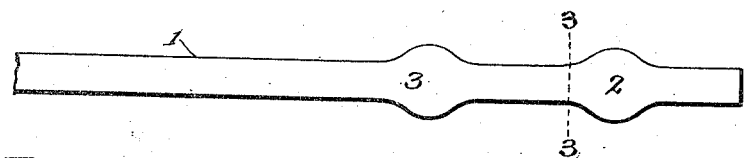
Figure 3:
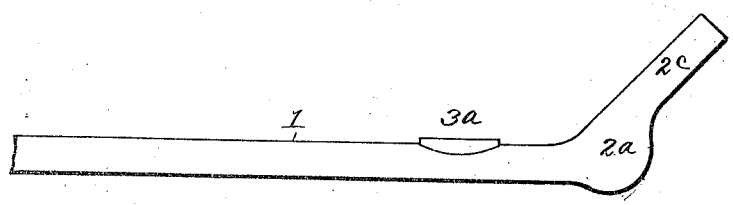
Figure 4:
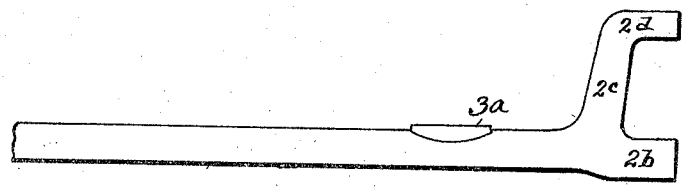

In the drawings:—Figure 1, shows a bar of metal that has been treated according to the first step of the process. Fig. 2, shows it after treatment according to the second step. Fig. 3, shows its shape and condition after it has been treated according to the third step. Fig. 4, shows its shape and condition when it is finished after being treated according to the fourth step.

A bar 1 is selected that has the desired or requisite cross diameter and length. It is heated and upset at a point intermediate its ends and at a point suitable for the junction of the two branches of the yoke. Without re-heating, and while still under the original heat it is upset a second time between the point of the first upset and the end of the bar, producing two upset portions or two enlarged portions, both of which are near the end of the bar on which the fork is to be made. The third step results in bending the bar at the upset portion 2, and substantially throwing the enlargement of this upset portion to the outside of the bend, the bend being made at substantially the line 3—3 of Fig. 2. During the same operation the upset portion 3 is swaged down and broadened out to form a spring seat $3^a$ as shown in Fig. 3. The third step results in the drawing out of the enlarged portion $2^a$ into the fork or prong $2^b$ and bending the end $2^c$ to make the upper branch of the horn $2^d$, bringing the axes of the branches $2^b$ and $2^d$ into parallel relation and forming them with dies to the proper shape. All of the steps are carried out with the aid of dies and presses.

What we claim as novel is:

The art of producing the front axle yoke of an automobile vehicle, consisting in upsetting a bar of metal intermediate its ends to produce an enlargement; second: again upsetting the bar of metal intermediate its ends to produce a second enlargement, one of said enlargements being finally used for the spring seat, and the other of said enlargements being finally used for the foot bearing; third, compressing one of said enlargements to form a spring seat and bending the bar closely adjacent to the other of said enlargements, and thereby throwing the enlargement to the outside of the said bending; fourth, drawing and shaping the last-mentioned enlargement to the foot bearing of an axle yoke, and bending the projecting end to form the upper bearing of said axle yoke, substantially as described.

In testimony whereof, we sign this specification in the presence of two witnesses.

ALFRED JOHNSON.
CHARLES L. BOCKUS.

Witnesses:
R. A. PARKER,
WILLIAM M. SWAN.